US012688074B2

(12) United States Patent
Malvankar et al.

(10) Patent No.: US 12,688,074 B2
(45) Date of Patent: Jul. 21, 2026

(54) DYNAMIC COMPUTING RESOURCE MANAGEMENT

(71) Applicant: International Business Machines Corporation, Armonk, NY (US)

(72) Inventors: Abhishek Malvankar, White Plains, NY (US); Alaa S. Youssef, Valhalla, NY (US); Ashish Kamra, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 520 days.

(21) Appl. No.: 18/343,086

(22) Filed: Jun. 28, 2023

(65) Prior Publication Data

US 2025/0004850 A1 Jan. 2, 2025

(51) Int. Cl.
*G06F 9/50* (2006.01)
(52) U.S. Cl.
CPC .................................... G06F 9/505 (2013.01)
(58) Field of Classification Search
CPC ....................................................... G06F 9/505
USPC ......................................................... 718/104
See application file for complete search history.

(56) References Cited

U.S. PATENT DOCUMENTS

| | | | |
|---|---|---|---|
| 7,840,662 B1 | 11/2010 | Natanzon | |
| 7,877,751 B2 * | 1/2011 | Maeda .................. | G06F 9/4893 |
| | | | 713/300 |
| 8,260,840 B1 | 9/2012 | Sirota et al. | |
| 8,650,298 B2 | 2/2014 | Daly et al. | |
| 8,706,852 B2 | 4/2014 | Kunze et al. | |
| 9,094,415 B2 | 7/2015 | Olsen et al. | |
| 9,280,390 B2 | 3/2016 | Sirota et al. | |
| 9,588,797 B2 | 3/2017 | Ashok et al. | |
| 9,971,621 B1 | 5/2018 | Berg et al. | |
| 10,846,144 B2 | 11/2020 | Knaup et al. | |
| 11,609,794 B2 | 3/2023 | Akinapelli et al. | |
| 2016/0323377 A1 | 11/2016 | Einkauf et al. | |
| 2021/0149743 A1 * | 5/2021 | Chen ..................... | G06F 9/5077 |
| 2022/0129460 A1 | 4/2022 | Clifford et al. | |
| 2024/0385887 A1 * | 11/2024 | Xu ......................... | G06F 9/5038 |

FOREIGN PATENT DOCUMENTS

| | | |
|---|---|---|
| CN | 107734035 B | 4/2020 |
| JP | 6732798 B2 | 7/2020 |

* cited by examiner

*Primary Examiner* — Charlie Sun

(74) *Attorney, Agent, or Firm* — Cantor Colburn LLP; Rakesh Roy

(57) ABSTRACT

Some embodiments of the present disclosure are directed to systems, computer-readable media, and computer-implemented methods for dynamic computing resource management. Some embodiments are directed to identifying a computing resource common between a first workload and a second workload, replacing a label associated with the first workload on the identified computing resource with a label associated with the second workload, executing the second workload using the identified computing resource. Other embodiments may be disclosed or claimed.

20 Claims, 3 Drawing Sheets

100

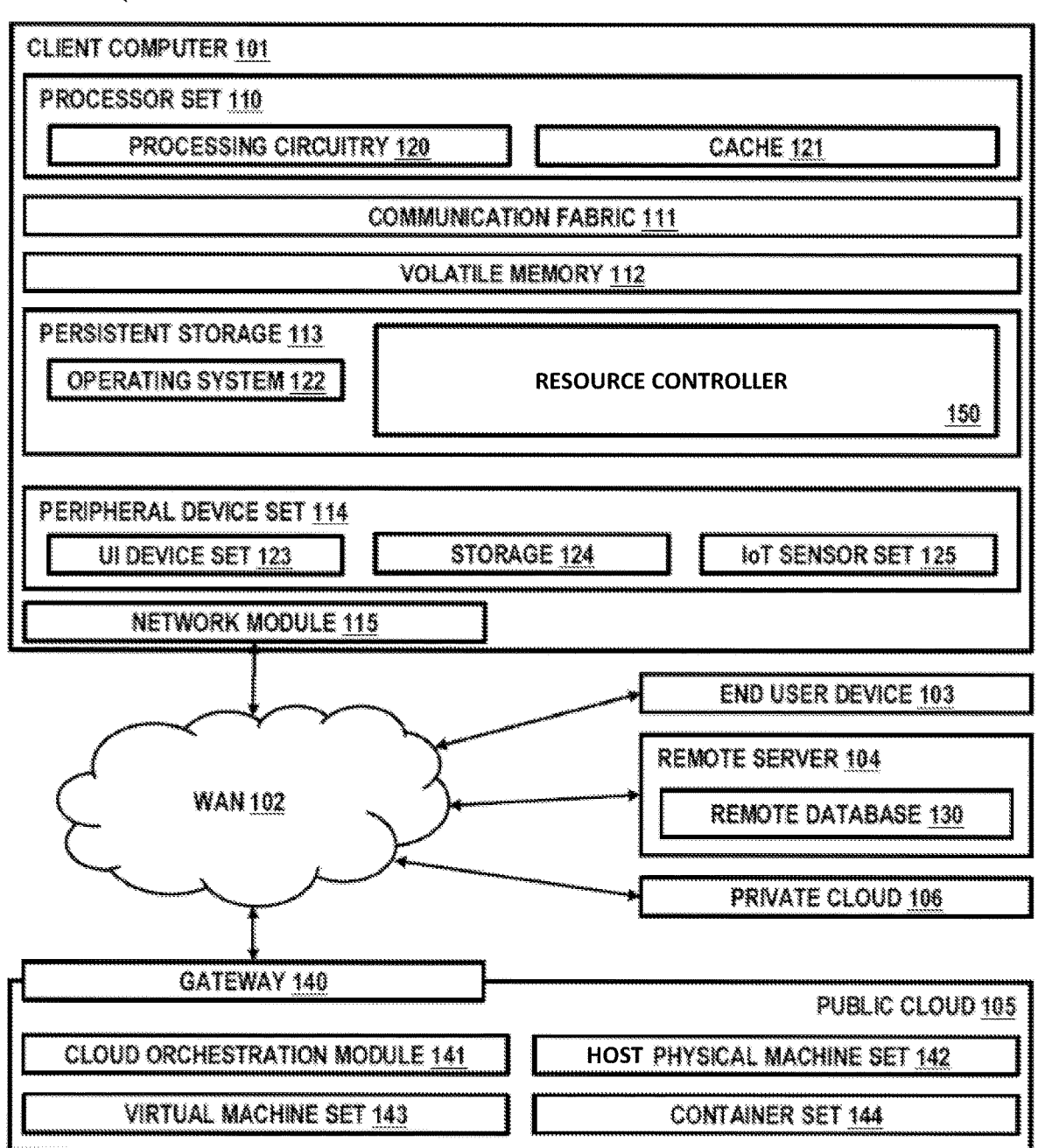

CLIENT COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122          RESOURCE CONTROLLER

150

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

QUEUED WORKLOAD
210

PERFORM QUOTA ENFORCEMENT
230

ACQUIRE RESOURCES
240

CLOUD PROVIDER
250

AGGREGATED RESOURCE
ASSIGNMENT
260

MARK NODES TO BE DELETED
270

AGGREGATED SCALE DOWN
280

300

ACQUIRE COMPUTING RESOURCES — 305

EXECUTE FIRST WORKLOAD — 310

IDENTIFY SECOND WORKLOAD — 315

IDENTIFY RESOURCE(S) COMMON TO FIRST WORKLOAD AND SECOND WORKLOAD — 320

REPLACE LABEL(S) — 325

EXECUTE SECOND WORKLOAD — 330

DYNAMIC COMPUTING RESOURCE MANAGEMENT

BACKGROUND

Embodiments of the present invention generally relate to computer resource management, and more specifically, to computer systems, computer-implemented methods, and computer program products for dynamic computing resource management between workloads.

Cloud computing systems are increasingly used in a variety of applications. Among other things, cloud computing allows for computing resources, such as hardware devices (e.g., servers, processors, and memory devices) and software services (e.g., virtual machines, databases, artificial intelligence and machine learning processing, and data analytics) to be dynamically allocated based on the need of the particular application. In this manner, cloud computing systems can support the need for varying amounts and types of computing resources without requiring an end-user to incur the expenses to support hardware and software that may only be needed for relatively brief periods of high resource demand.

In some systems, collections of computing resources may be referred to as "pods," which can be acquired from one or more cloud providers. However, to enable a resource to place pods, the proper resources must be acquired from the cloud provider and each resource needs to be configured. The time to acquire and configure computing resources, which may be referred to as "scaling time" can be significant. In some cases, scaling times may depend on the available capacity for a target cloud provider and may sometimes run as long as (or longer than) the time to execute a job or workload using the acquired resources.

Embodiments of the present disclosure address these and other issues by providing enhanced systems to re-use allocated resources between workloads to optimize scaling times.

SUMMARY

Embodiments of the present invention are directed to computer systems, computer-readable media, and computer-implemented methods for dynamic computing resource management. One exemplary embodiment includes a computer system comprising a processor and a memory coupled to the processor. The memory stores instructions that, when executed by the processor, cause the computer system to acquire, from a cloud-based resource provider, a plurality of computing resources to execute a first workload and to execute the first workload using the plurality of computing resources. The memory further stores instructions to identify a second workload for execution subsequent to the execution of the first workload, and to identify a computing resource in the plurality of computing resources common to the first workload and the second workload. The memory further stores instructions to replace a label associated with the first workload on the identified computing resource with a label associated with the second workload, and to execute the second workload using the identified computing resource.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 1 is a block diagram illustrating an example of a computer system for use in conjunction with various embodiments of the present disclosure;

DETAILED DESCRIPTION

Figure 2:
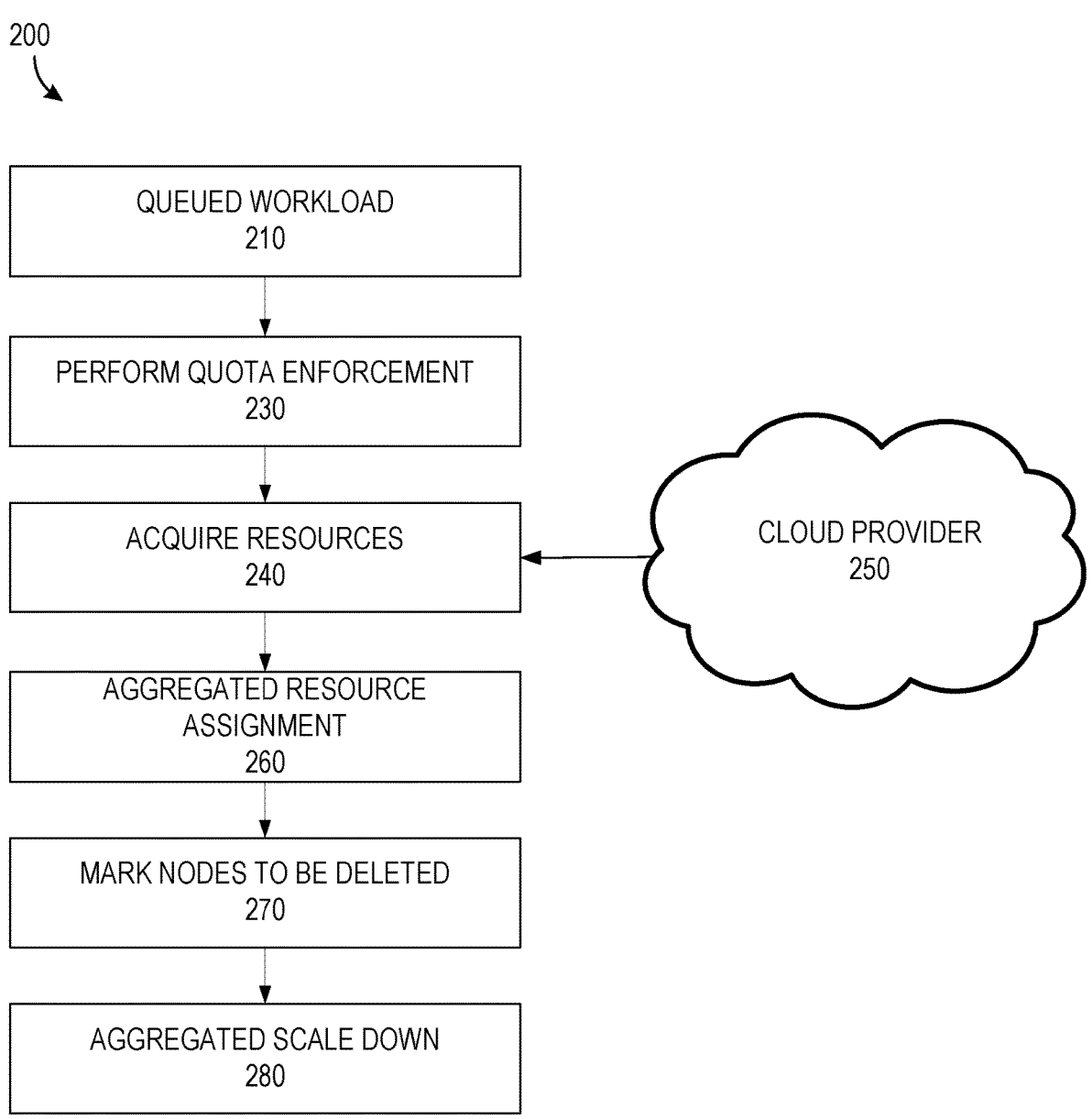
FIG. 2 illustrates an example of a process for dynamic computing resource allocation in accordance with various embodiments of the disclosure.

Disclosed herein are methods, systems, and computer program products for dynamic computing resource allocation. Among other things, embodiments of the present disclosure can utilize computing resources more efficiently with less scaling time required for individual workloads, thereby improving the level of accuracy of systems operating in conjunction with resources provided from cloud computing systems.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums" or "computer-readable mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as a resource controller 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Client computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer

101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Dynamic Computing Resource Management

As introduced above, the scaling time associated with acquiring and configuring cloud-based resources can be significant. Embodiments of the present disclosure help reduce such scaling times by reusing computing resources owned by a first (previous) workload in a second (subsequent) workload. Among other things, this can significantly reduce the scaling time associated with a queue of workloads that utilize the same resources or subsets thereof.

FIG. 2 provides a functional block diagram illustrating an example of a process 200 for dynamic computing resource management in accordance with one or more embodiments of the present invention. In some embodiments, process 200 may be implemented using the resource controller 150 depicted in FIG. 1.

In this example, process 200 includes providing a workload queue (block 210) to the resource controller 150. In various embodiments, the workloads in the workload queue 210 may be received from the same or different users and may require the use of at least one resource from cloud provider 250. For example, in some embodiments a user may submit a workload defined in a data serialization language such as YAML (Yet Another Markup Language) that requires multiple computing resource instance types from the cloud provider 250 to start a workload. The workload is placed in the workload queue 210 awaiting analysis from the resource controller 150.

At block 230, the controller 150 performs a quota enforcement process to determine whether the requested computing resource(s) may be added. For example, if the workload requires the addition of a computing resource type for which a quota associated with the user has already been met (e.g., a predetermined number of virtual machines), then the controller 150 will prevent addition of additional resources of that type. Otherwise, the controller 150 adds needed resources to the cluster of available resources to execute the workload.

In some embodiments, the quota enforcement process 230 may restrict the aggregate resource consumption within a particular namespace. Additionally or alternatively, the quota enforcement process 230 may include a hierarchical quota process that limits aggregate resource consumption by checking the assigned quota to a user or a node across a plurality of namespaces. For example, the computing resources available for execution of the workloads in workload queue 210 may be represented in a hierarchical (e.g., tree) structure, with each computing resource represented by a node in the hierarchy. Computing resources from the cloud provider 250 may be represented using other data structures as well.

At block 240, the controller 150 acquires the necessary computing resources to execute the next workload in the queue from cloud provider 250 and labels each such computing resource with a label associated with the next workload. At block 260, the controller 150 performs a matching strategy for aggregated resource assignment based on the workloads in the queue 210.

For example, a first workload may be executed using a plurality of computing resources acquired from cloud provider 250. The controller 150 may analyze the remaining workloads in the workload queue 210 to identify one or more computing resources in the plurality of computing resources used in the execution of the first workload that are common to a second (subsequent) pending workload in the queue, as well as for any number of other workloads pending in the queue 210. After execution of the first workload and prior to execution of the second workload, the controller 150 may replace a label associated with the first workload on the identified computing resource(s) with a label associated with the second workload, and execute the second workload using the identified computing resource(s).

In some embodiments, if the second workload (or other workloads subsequent to the first workload) needs a subset of the computing resources acquired from the cloud provider 250 for the first workload, the subset of computing resources can be relabeled and reused. The computing resources used by the first workload but not needed by the second or subsequent workloads may be released back to the cloud provider 250 and deleted from the aggregated pool of resources available for the workloads in workload queue 210.

In some cases, the second workload can re-use resources utilized by the first workload, but may still need additional or different resources than previously acquired and configured from cloud provider 250. In such cases, the controller 220 may relabel and re-use the resources from the first workload and acquire additional computing resources from cloud provider 250 that can be added to the cluster. These newly-added resources may be analyzed in conjunction with the remaining (e.g., third and subsequent) workloads in the queue to identify combinations of resources from the first and second workloads that can be relabeled and re-used with the third and/or subsequent workloads.

At block 270, the controller 150 marks resource nodes belonging to the previous workload that are not to be re-used by one or more subsequent workloads for deletion. At block 280 the controller scales down the aggregated pool of resources based on the resource nodes marked for deletion at block 270.

In some embodiments, a system operating in conjunction with embodiments of the present disclosure, such as the resource controller 150 depicted in FIG. 1, may swap labels on resource nodes from a label associated with a first workload to a label associated with a second (subsequent) workload in order to place the second workload on the desired computing resource. In this manner, embodiments of the present disclosure avoid adding or acquiring duplicate resources and can dramatically reduce the scaling time associated with executing workloads by relabeling pre-acquired resources for use with Embodiments of the present disclosure may be used to selectively release resources back to the cloud provider 250 to help minimize scaling times. For example, in some embodiments resources may be deleted from the aggregated pool of resources (and released back to the cloud provider 250) once execution of a workload using the resources has completed and the controller 150 determines the resources are not needed by a subsequent workload. In some embodiments, the controller 150 may detect a failure in the execution of a workload, and, in response to detecting the failure, return computing resources used by the failed workload to the cloud-based provider 250 that the controller 150 determines are not needed by a subsequent workload in the workload queue 210. In this manner, embodiments of the present disclosure help guarantee workload execution and scale-down of resources when a workload has failed or successfully completes execution.

Figure 3:
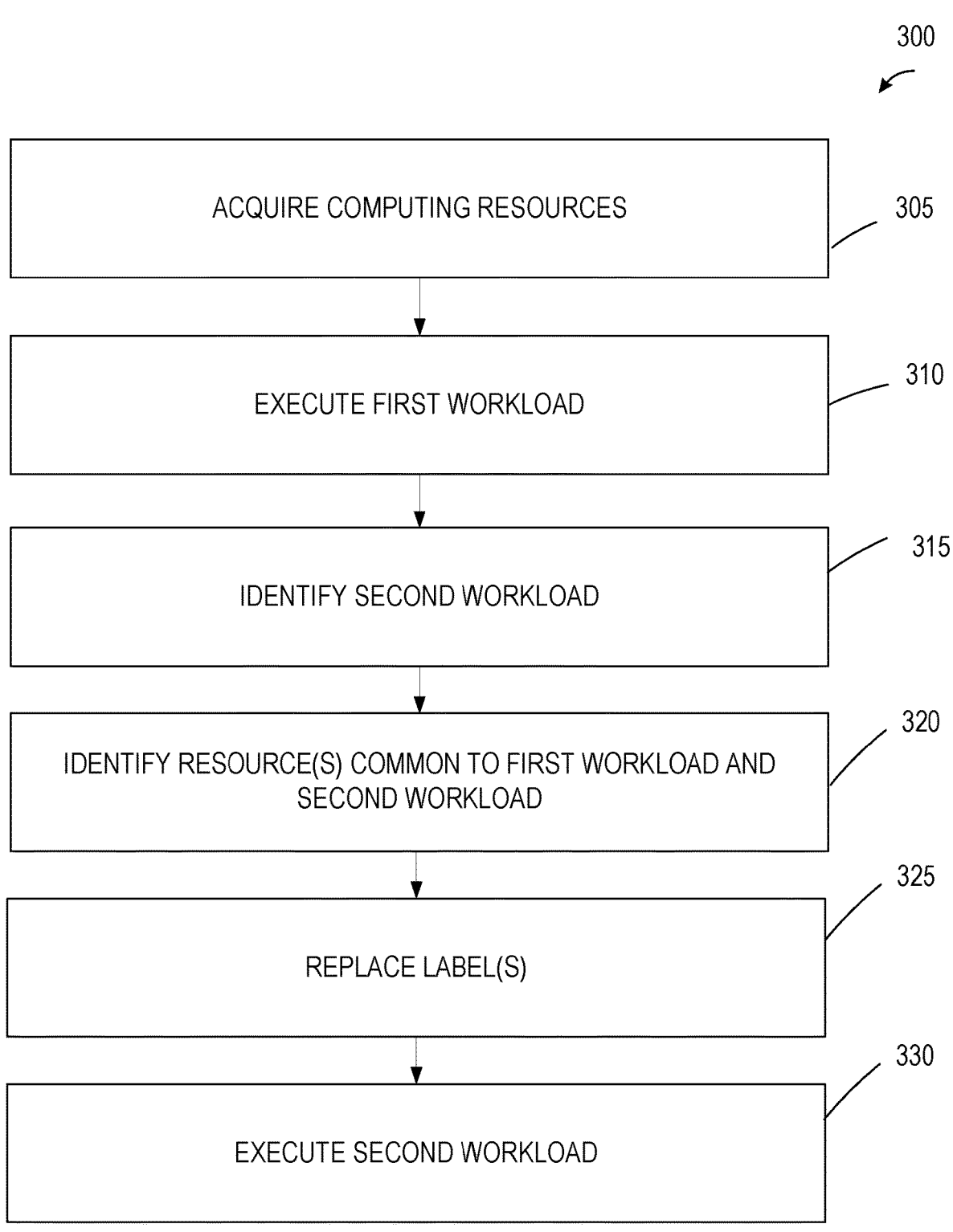
FIG. 3 is a flowchart of a method for dynamic computing resource allocation in accordance with various embodiments of the present disclosure.

FIG. 3 illustrates an example of a process for dynamic computing resource management in accordance with various embodiments of the present disclosure. Process 300 may be performed by any suitable system or combination of systems, such as by resource controller 150 in FIG. 1. In this example, process 300 includes, at block 305, acquiring, from a cloud-based resource provider (such as cloud provider 250 in FIG. 2), a plurality of computing resources to execute a first workload. Process 300 further includes, at block 310, executing the first workload using the plurality of computing resources. Process 300 further includes, at block 315, identifying a second workload for execution subsequent to the execution of the first workload. Process 300 further includes, at block 320, identifying a computing resource in the plurality of computing resources common to the first workload and the second workload. Process 300 further includes, at block 325, replacing a label associated with the first workload on the identified computing resource with a label associated with the second workload. Process 300 further includes, at block 330, executing the second workload using the identified computing resource.

In some embodiments, acquiring the plurality of computing resources includes adding a label associated with the first workload to each respective computing resource in the plurality of computing resources.

In some embodiments, the resource controller 150 may return computing resources from the plurality of computing resources to the cloud-based provider that are not used by the second workload subsequent to completion of the execution of the first workload.

In some embodiment, the resource controller 150 may detect a failure in the execution of the first workload, and to return computing resources from the plurality of computing resources to the cloud-based provider that are not used by the second workload in response to detecting the execution failure.

In some embodiment, acquiring the plurality of computing resources includes performing a hierarchal quota enforcement process to confirm the acquisition of each computing resource in the plurality of computing resources. The hierarchal quota enforcement process may be based on a type of computing resource for each computing resource in the plurality of computing resources. For example, the type of computing resource may be associated with at least one of: a processor, a computing device, a storage medium, a virtual machine, and a software service.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram, or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer system comprising:

a processor; and a memory coupled to the processor and storing instructions that, when executed by the processor, cause the computer system to:

perform a hierarchal quota enforcement process to confirm acquisition of computing resources, the hierarchal quota process limiting aggregate resource consumption by checking an assigned quota to a user or a node across a plurality of namespaces and being based on a type of computing resource;

acquire, from a cloud-based resource provider, a plurality of computing resources comprising at least one of virtual machine instances or container instances to execute a first workload;

execute the first workload using the plurality of computing resources;

identify a second workload for execution subsequent to the execution of the first workload;

identify a computing resource in the plurality of computing resources common to the first workload and the second workload;

perform a matching strategy for aggregated resource assignment based on workloads in a workload queue to select the identified computing resource;

replace a label associated with the first workload on the identified computing resource with a label associated with the second workload by swapping labels on the identified computing resource to place the second workload on the identified computing resource;

mark resource nodes belonging to the first workload that are not to be re-used by one or more subsequent workloads for deletion;

execute the second workload using the identified computing resource; and return computing resources corresponding to the resource nodes marked for deletion to the cloud-based resource provider and scale down an aggregated pool of resources based on the resource nodes marked for deletion.

2. The computer system of claim 1, wherein acquiring the plurality of computing resources includes adding a label associated with the first workload to each respective resource in the plurality of computing resources.

3. The computer system of claim 1, wherein the memory further stores instructions to return resources from the plurality of computing resources to the cloud-based resource provider that are not used by the second workload subsequent to completion of the execution of the first workload.

4. The computer system of claim 1, wherein the memory further stores instructions to detect a failure in the execution of the first workload, and to return computing resources from the plurality of computing resources to the cloud-based resource provider that are not used by the second workload in response to detecting the execution failure.

5. The computer system of claim 1, wherein acquiring the plurality of computing resources includes performing a hierarchal quota enforcement process to confirm the acquisition of each computing resource in the plurality of computing resources.

6. The computer system of claim 5, wherein the hierarchal quota enforcement process is based on a type of computing resource for each computing resource in the plurality of computing resources.

7. The computer system of claim 6, wherein the type of computing resource is associated with at least one of: a processor, a computing device, a storage medium, a virtual machine, and a software service.

8. A computer-readable medium storing instructions that, when executed by a computer system, cause the computer system to:

perform a hierarchal quota enforcement process to confirm acquisition of computing resources, the hierarchal quota process limiting aggregate resource consumption by checking an assigned quota to a user or a node across a plurality of namespaces and being based on a type of computing resource;

acquire, from a cloud-based resource provider, a plurality of computing resources comprising at least one of virtual machine instances or container instances to execute a first workload;

execute the first workload using the plurality of computing resources;

identify a second workload for execution subsequent to the execution of the first workload;

identify a computing resource in the plurality of computing resources common to the first workload and the second workload;

perform a matching strategy for aggregated resource assignment based on workloads in a workload queue to select the identified computing resource;

replace a label associated with the first workload on the identified computing resource with a label associated with the second workload by swapping labels on the identified computing resource to place the second workload on the identified computing resource;

mark resource nodes belonging to the first workload that are not to be re-used by one or more subsequent workloads for deletion;

execute the second workload using the identified computing resource; and return computing resources corresponding to the resource nodes marked for deletion to the cloud-based resource provider and scale down an aggregated pool of resources based on the resource nodes marked for deletion.

9. The computer-readable medium of claim 8, wherein acquiring the plurality of computing resources includes adding a label associated with the first workload to each respective computing resource in the plurality of computing resources.

10. The computer-readable medium of claim 8, wherein the instructions, when executed by the computer system, further cause the computer system to return computing resources from the plurality of computing resources to the cloud-based resource provider that are not used by the second workload subsequent to completion of the execution of the first workload.

11. The computer-readable medium of claim 8, wherein the instructions, when executed by the computer system, further cause the computer system to detect a failure in the execution of the first workload, and to return computing resources from the plurality of computing resources to the cloud-based resource provider that are not used by the second workload in response to detecting the execution failure.

12. The computer-readable medium of claim 8, wherein acquiring the plurality of computing resources includes performing a hierarchal quota enforcement process to confirm the acquisition of each computing resource in the plurality of computing resources.

13. The computer-readable medium of claim 12, wherein the hierarchal quota enforcement process is based on a type of computing resource for each computing resource in the plurality of computing resources.

14. The computer-readable medium of claim 13, wherein the type of computing resource is associated with at least one of: a processor, a computing device, a storage medium, a virtual machine, and a software service.

15. A computer-implemented method comprising:

performing, by a computer system, a hierarchal quota enforcement process to confirm acquisition of computing resources, the hierarchal quota process limiting aggregate resource consumption by checking an assigned quota to a user or a node across a plurality of namespaces and being based on a type of computing resource;

acquiring, by the computer system, from a cloud-based resource provider, a plurality of computing resources comprising at least one of virtual machine instances or container instances to execute a first workload;

executing, by the computer system, the first workload using the plurality of computing resources;

identifying, by the computer system, a second workload for execution subsequent to the execution of the first workload;

identifying, by the computer system, a computing resource in the plurality of computing resources common to the first workload and the second workload;

performing, by the computer system, a matching strategy for aggregated resource assignment based on workloads in a workload queue to select the identified computing resource;

replacing, by the computer system, a label associated with the first workload on the identified computing resource with a label associated with the second workload by swapping labels on the identified computing resource to place the second workload on the identified computing resource;

marking, by the computer system, resource nodes belonging to the first workload that are not to be re-used by one or more subsequent workloads for deletion;

executing, by the computer system, the second workload using the identified computing resource; and returning, by the computer system, computing resources corresponding to the resource nodes marked for deletion to the cloud-based resource provider and scaling down an aggregated pool of resources based on the resource nodes marked for deletion.

16. The computer-implemented method of claim 15, wherein acquiring the plurality of computing resources includes adding a label associated with the first workload to each respective computing resource in the plurality of computing resources.

17. The computer-implemented method of claim 15, further comprising returning, by the computer system, computing resources from the plurality of computing resources to the cloud-based resource provider that are not used by the second workload subsequent to completion of the execution of the first workload.

18. The computer-implemented method of claim 15, further comprising detecting, by the computer system, a failure in the execution of the first workload, and returning computing resources from the plurality of computing resources to the cloud-based resource provider that are not used by the second workload in response to detecting the execution failure.

19. The computer-implemented method of claim 15, wherein acquiring the plurality of computing resources includes performing a hierarchal quota enforcement process to confirm the acquisition of each computing resource in the plurality of computing resources.

20. The computer-implemented method of claim 19, wherein the hierarchal quota enforcement process is based on a type of computing resource for each computing resource in the plurality of computing resources, and wherein the type of computing resource is associated with at least one of: a processor, a computing device, a storage medium, a virtual machine, and a software service.

* * * * *